A. ZOLLINGER.
REGULATING AND CONTROLLING BELLOWS FOR PNEUMATICALLY ACTUATED MUSICAL INSTRUMENTS.
APPLICATION FILED JUNE 6, 1914.

1,411,766. Patented Apr. 4, 1922.

WITNESSES.
W. A. Sinden.
C. A. Walter.

INVENTOR.
ADALBERT ZOLLINGER.
by. [signature]
Attorney.

UNITED STATES PATENT OFFICE.

ADALBERT ZOLLINGER, OF LEIPZIG EUTRITZSCH, GERMANY, ASSIGNOR TO FIRM POPPER & CO. GESELLSCHAFT MIT BESCHRANKTER HAFTUNG, OF LEIPZIG, GERMANY.

REGULATING AND CONTROLLING BELLOWS FOR PNEUMATICALLY-ACTUATED MUSICAL INSTRUMENTS.

1,411,766.   Specification of Letters Patent.   Patented Apr. 4, 1922.

Application filed June 6, 1914. Serial No. 843,399.

*To all whom it may concern:*

Be it known that I, ADALBERT ZOLLINGER, a subject of the Grand Duke of Baden, residing at Leipzig Eutritzsch, in Germany, have invented certain new and useful Improvements in Regulating and Controlling Bellows for Pneumatically-Actuated Musical Instruments, of which the following is a specification.

One part of this invention consists in a novel arrangement of the regulating valve associated with the regulating and controlling bellows of a pneumatically played musical instrument. Another part of the invention, associated with the said novel arrangement of the valve, consists of a device which automatically prevents excessive suction in the bellows, and thereby enables the tone strength to be more finely regulated than in the case of bellows regulated only by the action of a spring.

Figure 1:
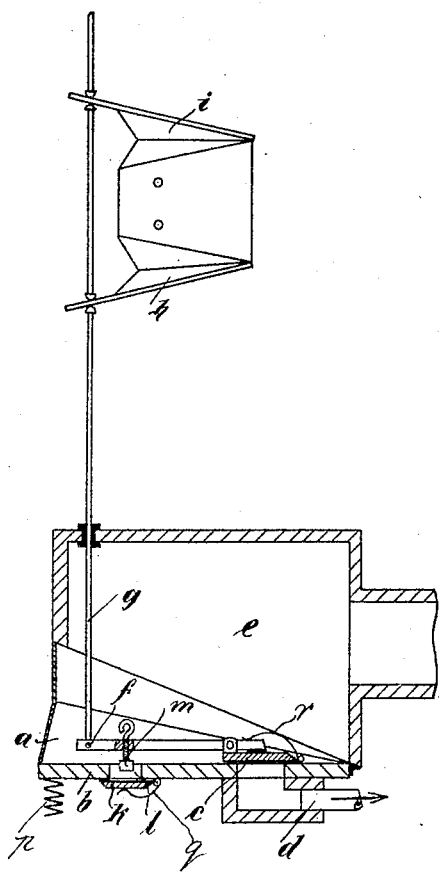
Figure 2:
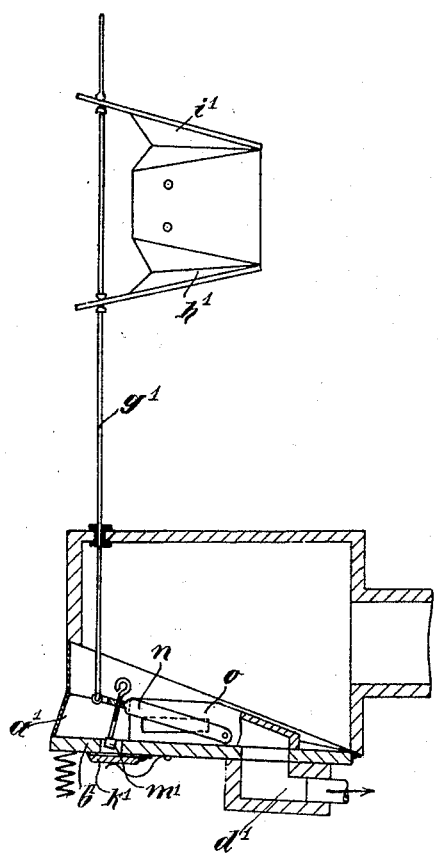

The invention is illustrated in the accompanying drawing, in which Figures 1 and 2 are vertical sections showing two embodiments thereof.

Referring in the first instance to Figure 1, $a$ designates the regulating bellows, upon the inside of whose movable wall or board $b$ is hinged a valve $c$, opening inwards and controlling the port to which is connected the flexible conduit $d$ to the blower. The valve $c$ serves to regulate the pressure in the bellows chamber $e$, and is connected by an arm $f$ and rod $q$ to two pneumatics $h$ and $i$, which lift and lower the valve respectively, for purposes of regulation.

In the board $b$ there is another port $l$ normally closed by a valve $k$ loaded with a weak spring and opening outwards. The arm $f$ carries a projection $m$ against which the flap $k$ abuts when the bellows $a$ are drawn together to a certain extent. If, therefore, the valve $c$ is given a certain position in relation to the wall $b$, through means of one of the bellows $h$ and $i$, the bellows $a$ cannot be drawn together to any considerable extent, but only to such an extent that the flap $k$ is opened by encountering the stop $m$, which causes air to enter the bellows and this prevents further drawing together of the bellows. In each position of the valve $c$ the contraction of the bellows is, therefore, limited by the action of the abutment $m$.

In Figure 2 $a^1$ designates the bellows, $b^1$ the movable board thereof, and $d^1$ the conduit leading to the blower. The port to which this conduit is joined opens into a box $o$ formed on the board $b^1$, and one wall of this box has a slot, across which a valve $n$ is moved, for regulating purposes, by a rod $g^1$ and pneumatics $h^1$ and $i^1$. To the valve is connected an abutment $m^1$, which limits the contraction of the bellows by opening a valve $k^1$, as previously described. The contraction or drawing together of the bellows $a^1$ is effected by opening the valve $n$ by the rod $g^1$ which is adjusted by the bellows $h^1$ and $i^1$.

Both embodiments shown can also be used for controlling or actuating purposes, and then have the advantage that the bellows can be held in any selected position without the aid of a locking device such as is commonly used.

The flow and the direction in which the air is drawn is indicated by the arrow on the drawings. The spring $p$ tends to push the walls of the bellows $a$ together, the spring $q$ tends to hold the valve $k$ closed, and the spring $r$ prevents vibration between the arm $f$ and valve.

What I claim as my invention and desire to secure by Letters Patent of the United States is:—

1. In a device of the character described the combination of a regulating bellows having a movable board, said board having a port, a valve mounted upon said movable board at said port for regulating the pressure in the bellows chamber, a conduit connected to said port and leading to a blower, means for controlling said valve, said board having an auxiliary port, a valve for the auxiliary port operating opposite to the first mentioned valve, means for operating one of said valves, said means being also operatively associated with the other valve to control the same, for the purpose set forth.

2. In a device of the character described the combination of a bellows having a movable board, said board having two ports, a valve mounted upon said board, controlling one of said ports, means for controlling said valve, a conduit connected to said valve controlled port, a normally closed valve upon the other port, and an abutment associated with the first mentioned valve, to move therewith, arranged to open the second mentioned valve upon contraction of the bellows, for the purpose set forth.

3. In a device of the character described, the combination of a regulating bellows having a movable board, said board having a port, a valve for said port mounted upon the movable board, a conduit connected to said port at one end and adapted to be connected at its opposite end to a blower, means including pneumatics for controlling said valve, for the purpose set forth, said board having an auxiliary port and a valve for said port operatively associated with said controlling means.

4. In a device of the character described, the combination of a bellows having a movable board, said movable board having two ports, a valve mounted upon said board controlling one of said ports, means for controlling said valve, a conduit connected to said valve controlled port, a valve for the other port, and means movable with the first mentioned valve arranged to actuate the second mentioned valve upon the contraction of the bellows, substantially as and for the purpose set forth.

In witness whereof I have signed this specification in the presence of two witnesses.

ADALBERT ZOLLINGER.

Witnesses:
 RUDOLPH FRICKE,
 ALICE DUNGER.